US011413660B2

(12) United States Patent
Tourigny

(10) Patent No.: US 11,413,660 B2
(45) Date of Patent: Aug. 16, 2022

(54) CLEANING DEVICE FOR OPTICAL FIBER COMPONENTS

(71) Applicant: ZYNON TECHNOLOGIES, LLC, New Britain, CT (US)

(72) Inventor: Jay S. Tourigny, Collinsville, CT (US)

(73) Assignee: ZYNON TECHNOLOGIES, LLC, New Britain, CT (US)

( * ) Notice: Subject to any disclaimer, the term of this patent is extended or adjusted under 35 U.S.C. 154(b) by 38 days.

(21) Appl. No.: 17/129,118

(22) Filed: Dec. 21, 2020

(65) Prior Publication Data

US 2021/0107037 A1 Apr. 15, 2021

Related U.S. Application Data

(60) Division of application No. 16/353,643, filed on Mar. 14, 2019, now abandoned, which is a division of application No. 15/090,152, filed on Apr. 4, 2016, now abandoned, which is a continuation of application No. 13/159,478, filed on Jun. 14, 2011, now abandoned.

(60) Provisional application No. 61/354,322, filed on Jun. 14, 2010.

(51) Int. Cl.
*B08B 1/00* (2006.01)
*B08B 11/00* (2006.01)
*G02B 6/38* (2006.01)

(52) U.S. Cl.
CPC .............. *B08B 1/006* (2013.01); *B08B 1/008* (2013.01); *B08B 11/00* (2013.01); *G02B 6/38* (2013.01); *G02B 6/3866* (2013.01)

(58) Field of Classification Search
CPC .......... B08B 11/00; B08B 1/006; B08B 1/008; G02B 6/38; G02B 6/3866
See application file for complete search history.

(56) References Cited

U.S. PATENT DOCUMENTS

| 2,585,061 | A |   | 2/1952  | Wester, Jr.       |           |
|-----------|---|---|---------|-------------------|-----------|
| 3,613,146 | A |   | 10/1971 | Oviatt            |           |
| 5,117,528 | A |   | 6/1992  | Kanayama et al.   |           |
| 5,220,703 | A |   | 6/1993  | Kanayama et al.   |           |
| 5,906,022 | A | * | 5/1999  | Ohkawa ........... | G08C 23/04|
|           |   |   |         |                   | 15/118    |
| 5,906,686 | A |   | 5/1999  | McNeil            |           |
| 6,098,239 | A |   | 8/2000  | Vosbikian         |           |

(Continued)

OTHER PUBLICATIONS

International Search Report for international application No. PCT/US2011/040245, international filing date of Jun. 14, 2011, dated Oct. 20, 2011, 5 pages.

(Continued)

*Primary Examiner* — Douglas Lee
(74) *Attorney, Agent, or Firm* — Cantor Colburn LLP

(57) ABSTRACT

A cleaning device (10, 110, 210) may be a card-like member such as a flap (16, 116), integrally formed with a dispenser container (12), or a slotted member (36) mounted on a stand-alone cleaning device (110). A cleaning wipe fabric (22, 122) has a modulus of stiffness which is high enough to bridge a plurality of cleaning slots (26a-26d, 126a-126d) and hold the fabric out of contact with the slot floor surfaces (26a'), and low enough to be deflected by a fiber optic end being cleaned to sag within the cleaning slot to better enclose and clean the tip of the fiber optic end. Used cleaning fabric (22, 122) can easily be advanced or removed as needed to avoid using the same area of fabric for cleaning more than once.

18 Claims, 6 Drawing Sheets

(56) References Cited

U.S. PATENT DOCUMENTS

| | | | |
|---|---|---|---|
| 6,415,471 | B1 | 7/2002 | Childers et al. |
| 6,560,811 | B1* | 5/2003 | Krause ................... B08B 11/00 |
| | | | 15/210.1 |
| 6,619,857 | B2 | 9/2003 | Miyake |
| 6,648,980 | B2 | 11/2003 | Childers et al. |
| 6,681,437 | B1 | 1/2004 | Miyake et al. |
| 6,865,770 | B2 | 3/2005 | Forrest |
| 7,192,197 | B2 | 3/2007 | Carberry et al. |
| 7,216,393 | B2 | 5/2007 | Sato et al. |
| 7,552,500 | B2 | 6/2009 | Forrest, Jr. |
| 2002/0108636 | A1* | 8/2002 | Childers .............. G02B 6/3866 |
| | | | 15/210.1 |
| 2003/0039463 | A1 | 2/2003 | Miyake |
| 2003/0126707 | A1 | 7/2003 | Sato et al. |
| 2004/0007250 | A1 | 1/2004 | Forrest, Jr. |
| 2006/0067635 | A1 | 3/2006 | Carberry et al. |
| 2006/0107479 | A1* | 5/2006 | Forrest ..................... B08B 1/00 |
| | | | 15/210.1 |
| 2009/0321283 | A1* | 12/2009 | Tourigny ............. B65D 75/366 |
| | | | 53/461 |
| 2010/0199452 | A1 | 8/2010 | Blair et al. |

OTHER PUBLICATIONS

Toray MK Cleaning Cloth webpage https://szchenyang.en.ec21.com/offer_detail/Sell_TORAY_TORAYSEE_MK_MC-9188488.html printed Feb. 5, 2018.

Written Opinion for international application No. PCT/US2011/040245, international filing date of Jun. 14, 2011, dated Oct. 20, 2011, 6 pages.

* cited by examiner

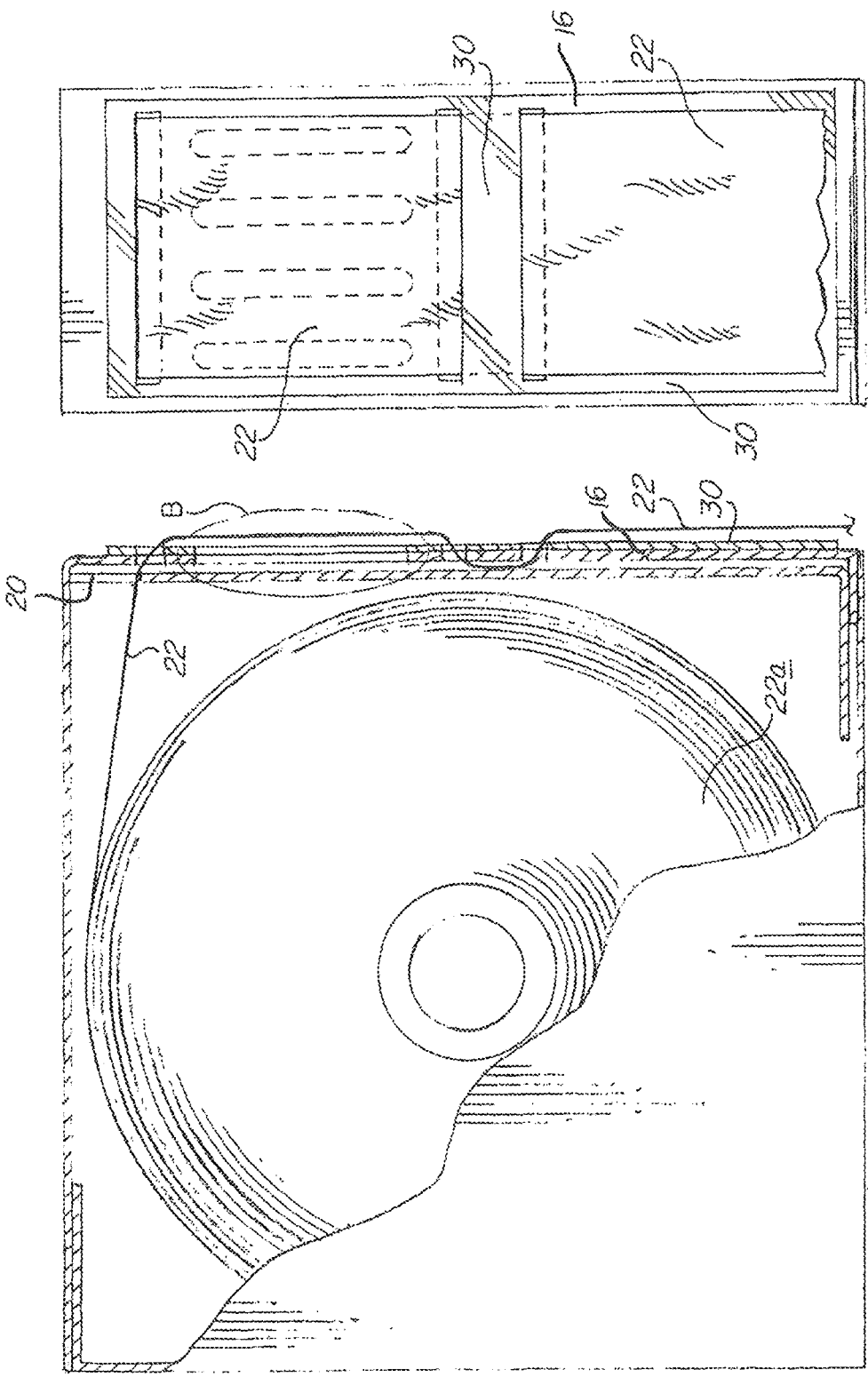

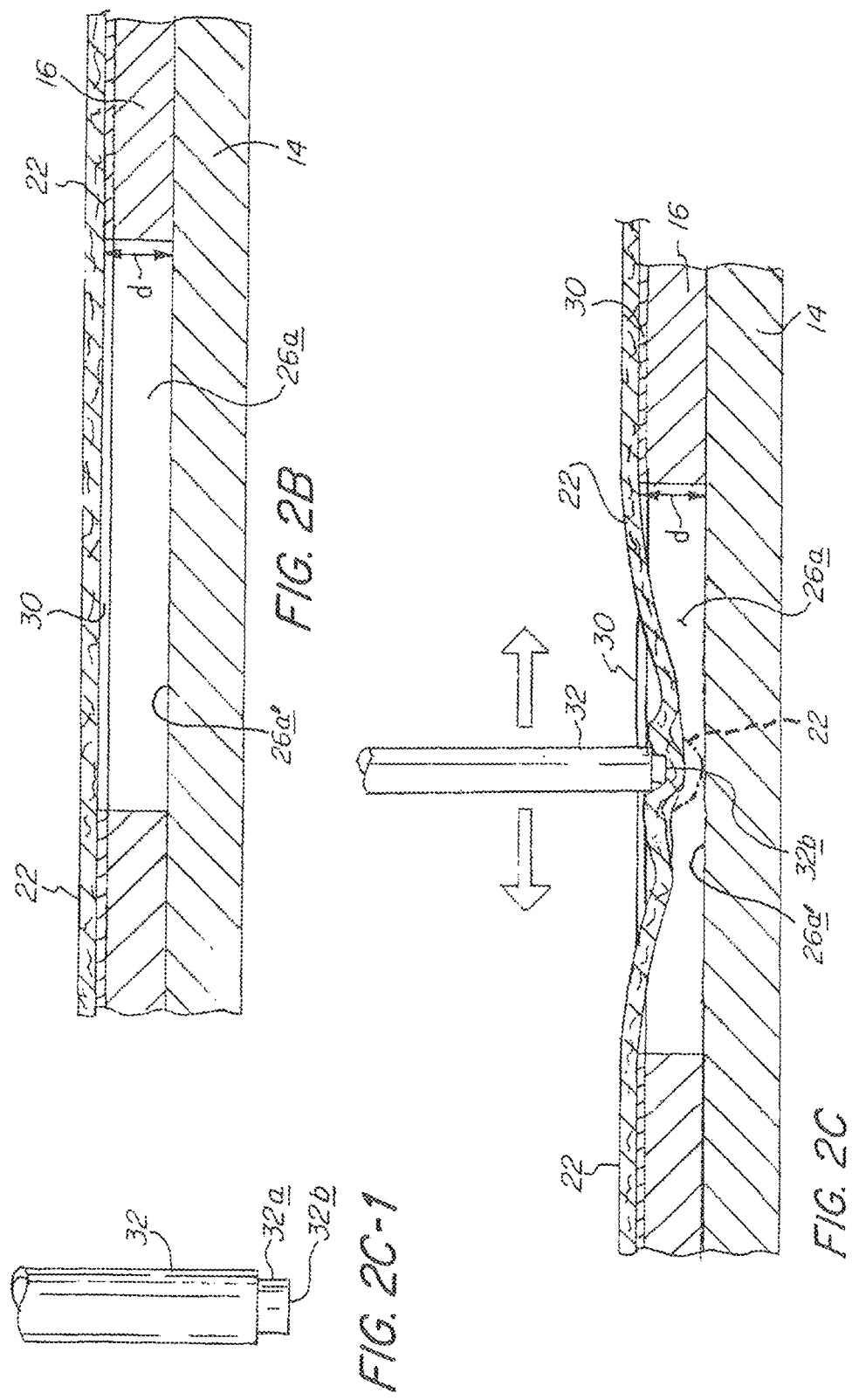

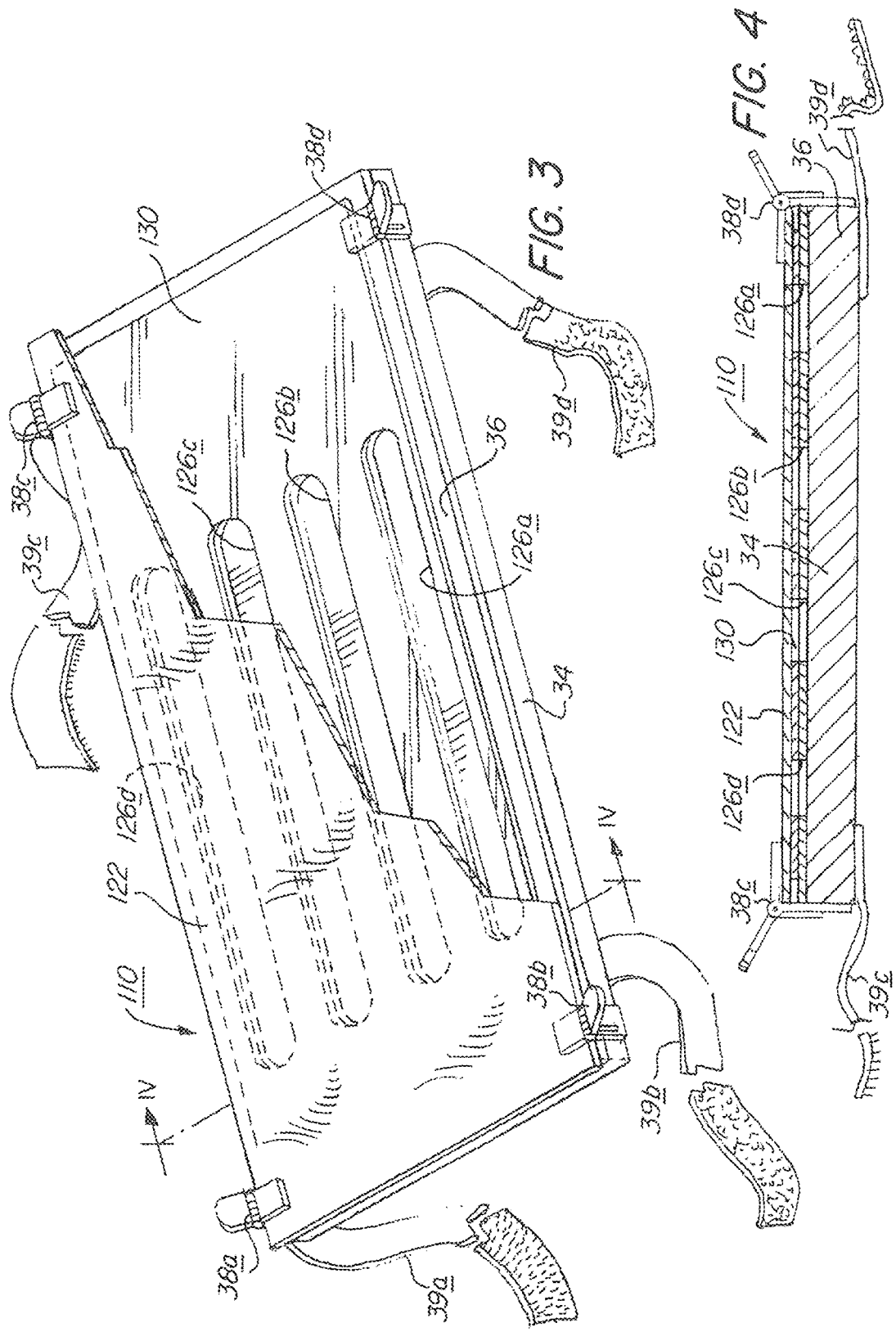

CLEANING DEVICE FOR OPTICAL FIBER COMPONENTS

CROSS-REFERENCE TO RELATED APPLICATION

This application is a divisional application of patent application Ser. No. 16/353,643, filed on Mar. 14, 2019, which is a divisional application of patent application Ser. No. 15/090,152, filed on Apr. 4, 2016, now abandoned, which is a continuation application of patent application Ser. No. 13/159,478, filed on Jun. 14, 2011, now abandoned, which claims the benefit of priority of provisional patent application Ser. No. 61/354,322, filed on Jun. 14, 2010.

BACKGROUND OF THE INVENTION

Field of the Invention

The present invention generally concerns a cleaning device for optical fiber components, and more particularly concerns a slotted card-like member having fabric-retaining structures associated with it to removably retain a cleaning wipe fabric in place on the device.

Related Art

U.S. Pat. No. 6,865,770, issued Mar. 15, 2005 to Edward J. Forrest, discloses a device for cleaning fiber optic components including a container within which a roll of cleaning wipe fabric is contained. A length of cleaning wipe fabric is withdrawn as needed and loosely overlies a soft, large work surface formed on a side of the container. Fiber optic ends may be cleaned by drawing a fiber optic component over a portion of the wipe which is backed by the soft work surface. The box is preferably made of paperboard, cardboard, molded plastic or electrostatic discharging fabric (column 3, lines 5-10).

U.S. Pat. No. 6,681,437, issued Jan. 27, 2004 to Taisei Miyake et al., discloses a cleaning tool for optical fiber connectors having a plurality of slit-shaped windows or slots protected by peel-off sheets beneath which is disposed a fixed sheet of cleaning wipe fabric. In the embodiment disclosed in FIG. 7 and described at column 5, lines 24-36, a cushion sheet 76 beneath the fixed cleaning sheet 63 may be provided with grooves 76B in the region of the windows 74. This permits deflecting the cleaning sheet 73 when an optical fiber connecting surface is pressed against the cleaning sheet, and is said to insure that the cleaning sheet 73 is uniformly pushed against the entire optical fiber connecting surface for cleaning.

SUMMARY OF THE INVENTION

Generally, the present invention provides a cleaning device comprising a support member, which may be a card-like member, such as a flap of a cardboard container, having a fabric support surface. The support member has one or more cleaning slots formed by cut-outs in the fabric support surface of the support member. A free length of cleaning wipe fabric, such as a hydro-entangled polyester fabric, useful for cleaning optical fiber components, such as fiber optic termini, by rubbing the component along the wipe fabric, is removably, that is, temporarily, secured to the support member. By a "free" length of fabric it is meant that the fabric is not permanently secured to the support member but, when not secured in place, the fabric may be moved in fabric-advance travel relative to the support member. Such fabric-advance travel is usually longitudinally along the fabric support surface provided by the entire surface of the support member, or a portion thereof. One or more fabric-retaining structures may be used to removably retain the wipe fabric in place, preferably but not necessarily by frictional engagement only, so that the fabric overlies and extends over the cleaning slots. The wipe fabric extending over a given cleaning slot is deflected and may be shifted slightly by the pressure applied by rubbing the optical fiber component across the wipe fabric overlying the slot, to cause the wipe fabric to sag into the slot. Preferably, the wipe fabric remains in its sagged position even after the optical fiber component is removed, that is, a "durable sag" is imparted to the fabric over the slot.

Specifically, in accordance with one aspect of the present invention, there is provided a cleaning device for optical fiber strands which comprises the following components. A support member has a fabric support surface having a slotted portion in which are formed one or more cleaning slots having respective slot depths and floor surfaces. A free length of a cleaning wipe fabric is disposed in a cleaning position upon the fabric support surface with at least a portion of the free length of the fabric overlying the slotted portion of the support surface to define a cleaning section of the fabric with one or more portions of the cleaning section suspended over the one or more cleaning slots to define one or more suspended portions of the fabric, the fabric having a modulus of stiffness which is high enough to bridge the cleaning slots and low enough to sag into the cleaning slots under the following conditions. The slot depth of the one or more cleaning slots is sufficient to allow the suspended portions of the fabric to sag into their associated one or more cleaning slots when cleaning pressure is applied to the suspended portions of the fabric by wiping tips of such optical fiber strands on the suspended portions to clean such tips. A fabric-retaining structure is operatively associated with the support member and is disposed so as to expose one or more of the suspended portions of the fabric to access by such optical fiber strands, the fabric-retaining structure serving (1) to removably secure such fabric in the cleaning position whereby the tip of a fiber optic strand can be cleaned by wiping such tip over one or more of the suspended portions of the fabric, and (2) to release such fabric for fabric-advance travel relative to the support surface, whereby such travel serves to position a fresh section of the fabric in the cleaning position.

Another aspect of the present invention provides for the slot depth of the one or more cleaning slots to be sufficient to allow the suspended portion of such fabric to sag into its associated one or more slots when cleaning pressure is applied to the suspended portion of such fabric by wiping the tip of an optical fiber strand on such suspended portion of such fabric to clean the tip. In a related aspect of the invention, the slot depth of the one or more cleaning slots is such as to allow the tip of the fiber optic strand to force the fabric covering the tip into minimal contact with the floor of the cleaning slot.

In yet another aspect of the present invention, the fabric-retaining structure may comprise one or more retention members disposed on the support member and moveable between a securement position in which such fabric is retained in the cleaning position and a release position in which such fabric is released for fabric-advance travel. In an alternate aspect, the fabric-retaining structure may comprise one or more feed slots through which such fabric is fed, the feed slots being configured to exert a frictional drag on the fabric which drag is sufficient to secure such fabric in the cleaning position but insufficient to prevent fabric-advance travel upon application of a sufficient force to such fabric. A related aspect of the invention provides that the fabric-retaining structure may comprise at least one feed slot upstream of the one or more cleaning slots and at least one feed slot downstream of the one or more cleaning slots, as sensed in the direction of fabric-advance travel of such fabric along the support member, e.g., there may be at least two feed slots disposed adjacent to each other along the fabric-advance travel path, with no cleaning slot being interposed between them.

Yet another aspect of the present invention provides that the support member and the fabric-retaining structure may be so configured that fabric-advance movement of such fabric comprises dragging such fabric in a travel path across the fabric support surface. Another aspect of the present invention provides that the cleaning device further comprises an electrically conductive material disposed on the fabric support member and in the travel path, whereby the electrically conductive material contacts the fabric to dissipate static electrical charges from the fabric.

Still another aspect of the present invention provides for each of a plurality of cleaning slots on a support member to be distinctively marked, for example, each cleaning slot may have associated with it a distinctive code symbol selected from the class consisting of one or more of a distinctive color, a number, and a letter of the alphabet.

In accordance with a method aspect of the present invention, there is provided a method of cleaning optical fiber strands by use of a cleaning device, the method comprising the following steps. (a) A free length of a cleaning wipe fabric is placed in a cleaning position in which the fabric entirely covers at least one cleaning slot formed in a fabric support surface of a support member of the cleaning device, the cleaning slot having a floor having a floor surface and the portion of the fabric suspended over the at least one cleaning slot comprising at least one suspended portion of the fabric; (b) The fabric is removably secured in the cleaning position; (c) The tip of a fiber optic strand is rubbed over the suspended portion of the fabric with sufficient force to force the suspended portion into the slot and develop an enduring sag in the suspended portion of the fabric to thereby contact the entire tip of the strand with the fabric. Optionally, the fabric-covered tip may be forced into minimal contact with floor surface, that is, the fabric will make minimal contact with the floor surface; (d) The free length of fabric is then released for fabric-advance travel relative to the support surface; and (e) advancing the fabric along the fabric support surface to position a fresh suspended portion of the fabric over the at least one cleaning slot.

Another method aspect of the present invention provides that the cleaning device may have a plurality of the cleaning slots covered by respective suspended portions of the fabric, and step (c) described above is carried out on two or more of the suspended portions of the fabric prior to carrying out step (d) described above.

Other method aspects of the invention provide for one or more of the following steps in any suitable combination. The above-described step (b) may be carried out by releasably fastening the free length of fabric to the support member, and the above-described step (d) may be carried out by unfastening the free length of fabric; the support member may have at least one feed slot which is configured to exert a frictional drag on the fabric when the fabric is threaded through the at least one feed slot, the above-described step (b) is carried out by threading the fabric through the at least one feed slot, and the above-described step (d) is carried out by advancing the fabric with sufficient force to overcome the frictional drag; the support member may have an electrically conductive area upstream of the cleaning slot and the method may include advancing the fabric over the electrically conductive area to dissipate any electrostatic charge in the fabric prior to carrying out the above-described step (c); and the above-described step (c) may be carried out by rubbing the tip of the fiber optic strand with sufficient force that fabric covering the tip makes minimal contact with the floor of the cleaning slot.

One aspect of the invention provides for the fabric to have a modulus of stiffness such that the suspended portion of the fabric is stiff enough to bridge the cleaning slots and compliant enough to sag into the cleaning slot under pressure imposed on the suspended portion of the fabric by an optical fiber strand being cleaned on the suspended portion.

The term "fabric" is used herein and in the claims in the broadest sense to include and mean any compliant material suitable for use in cleaning fiber optic components as described herein.

Other aspects of the present invention will be apparent from the following description and appended drawings.

BRIEF DESCRIPTION OF THE DRAWINGS

FIG. 2 is a side view in elevation of the cleaning device of FIG. 1 with a major portion thereof broken away, to show a roll of cleaning wipe fabric disposed therein, and with the flap thereof in its closed position;

FIG. 2A is a front view in elevation of the cleaning device of FIG. 1 with a length of cleaning wipe fabric extending over a group of parallel cleaning slots in the flap;

FIG. 2B is a cross-sectional view, enlarged with respect to FIG. 2, of that portion of FIG. 2 enclosed by area B;

FIG. 2C is a view corresponding to that of FIG. 2B, but showing the tip of an optical fiber connecter being cleaned over one of the cleaning slots;

FIG. 2C-1 is a view, enlarged relative to FIG. 2C, of the optical fiber connector shown in FIG. 2C;

FIG. 3 is a perspective view of a second embodiment of the cleaning device of the present invention, showing cleaning wipe fabric, partially broken away, retained thereon;

FIG. 4 is a cross-sectional view taken along line IV-IV of FIG. 3;

DETAILED DESCRIPTION OF THE INVENTION AND SPECIFIC EMBODIMENTS THEREOF

Figure 1:
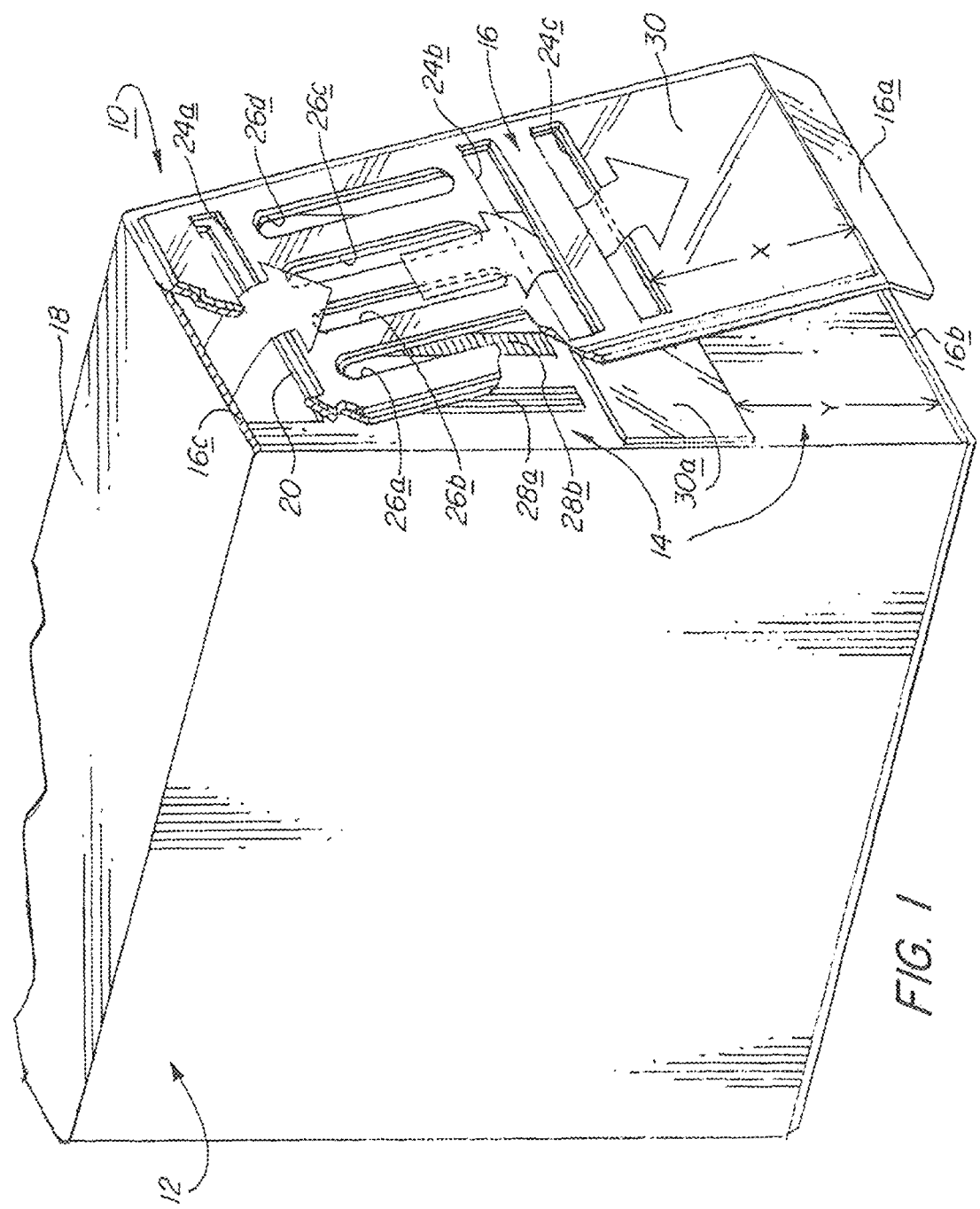
FIG. 1 is a perspective view, with portions thereof broken away, of a cleaning device in accordance with one embodiment of the present invention comprising a dispenser container, and showing the card-like member comprising a flap of the container and in an open position.

A significant advantage of the present invention is that the fabric is retained on the support surface of the support member loosely enough that the fabric will follow the contours of the end face of a fiber optic strand and "bunch up" about the tip of the strand so as to ensure cleaning of the tip including a small area of the side of the strand immediately adjacent the tip. The depth d of the cleaning slots is selected, taking into consideration the physical characteristics of the fabric, to permit the fabric to sag and envelop the tip of the optical strand being cleaned. Alternatively, the depth d may be such that the end face or tip of the strand "bottoms out" against the surface at the bottom of the cleaning slot. As used herein and in the claims, the term "minimal contact" means that the fabric-covered tip of the fiber optic strand makes enough contact with the surface at the bottom of the cleaning slot, i.e., the floor of the cleaning slot, to distribute along the slot floor some of the downward forces imposed on the fiber optic strand by the user. The contact is not so severe, however, as to grind or cut the fabric between the terminal end, i.e., the tip, of the fiber optic strand and the slot floor surface. While the slot floor may be soft, a soft surface is not usually necessary and the slot floor of the slot may be a hard surface, such as a plastic or cardboard surface.

Generally, the fabric-retaining structures removably secure the wipe fabric in place over the cleaning slots under sufficient tension to permit, but also limit, the overall movement of the wipe fabric when pressure is brought to bear on the fabric over the cleaning slots by the fiber optic component or strand being cleaned. Any suitable fabric-retaining structures may be used to hold the cleaning wipe fabric in place. For example, mechanical clips, gripper strips such as those sold under the trademark VELCRO, smooth clamping devices applying a slight pressure or, preferably, fabric feed slots formed by cut-outs in the support member may be employed as the fabric-retaining structure. When feasible, feed slots are preferred because of their simplicity and inexpensive nature.

The wipe fabric is not permanently physically secured to the individual cleaning slots or immediate surrounding areas. Instead, the design takes advantage of the natural initial modulus of stiffness of the wipe fabric, which is high (stiff) enough to provide uniform support of that portion of the fabric located immediately over and around the cleaning slots, thereby enabling the fabric to bridge the slots. This initial modulus is, however, low enough, i.e., flexible enough, that the fabric gives way in use under the load imposed by cleaning the fiber optic component to provide localized deflection, e.g., sagging, of the wipe fabric in the manner described below and illustrated in FIG. 2C. The amount of deflection is preferably limited to preclude or minimize contact with the surface of the slot floors. That is, the depth of the cleaning slots is great enough to accommodate the sag, preferably with the sagged fabric making no or just minimal contact with the floor of the slot.

Because of the small geometries involved with fiber optic termini, e.g., the tips of fiber optic strands, localized compression loads at point of contact of the strand on the fabric are high for all fiber optic components. All fiber optic connectors are small in diameter and therefore concentrate load onto a small area of the wipe fabric. Abrading, breaking or shearing of the wipe fabric is exacerbated when cleaning Flat or Angled (APC) Small Form Factor LC type connectors which have small surface area tips (1.25 mm diameter) and geometries with sharp angles. Military fiber optic strands have a diameter of 1.6 millimeters and another commonly used size is only 2.5 millimeters in diameter. These very small diameters bring high pressures to bear when the fiber optic end is pressed against the cleaning wipe fabric and moved back and forth for cleaning. High compression loads combined with inherent properties of poor tensile recovery of wipe fabric results in the generation of broken or sheared filament and fiber particles from the wipe fabric's matrix as the fiber optic component is rubbed across the fabric. The 1.25 mm fiber optic connectors are the most likely to cause the wipe fabric to tear because they have the smallest surface area on the end face and the Flat and Angled designs have the sharpest angles that can most readily tear fabric during cleaning. Because of the small diameter of fiber optic strands, even a mote-sized fabric particle left at the terminal transmission face can drastically reduce transmission capacity.

Upon contact by a fiber optic component, for example, as illustrated in FIG. 2C, the otherwise flat fabric surface deflects into the cleaning slot as the fabric conforms with the imposed load and perhaps shifts slightly. The user is guided to impose the optimal load by selecting it to deflect the wipe fabric only sufficiently to obtain the durable sag described above or to attain minimal contact with the bottom surface of the cleaning slot. FIG. 2C shows in phantom outline the fabric 22 pushed into minimal contact with the floor 26a' of cleaning slot 26. Stated otherwise, the user applies only sufficient force to deflect the wipe fabric into the cleaning slot without forcing it into firm or excessive contact with the floor of the cleaning slot. The resistance provided by the slot floor enables the user to properly control the amount of pressure imposed. The wipe fabric is held in place by frictional engagement only (either by feed slots or retention members) and so is free to move slightly as well as deflect under the imposed pressure, to provide thorough cleaning without tearing of the wipe fabric. The texture of the fabric's surface and the guidance provided concerning the optimal load provide ideal cleaning contact for removing contamination from the fiber optic component. The optimized load on the fabric surface, even during minimal contact with the slot floor, also minimizes potential for abrasion, breakage or shearing of individual filaments or fiber of the wipe fabric as the fiber optic component is rubbed on the fabric. This is distinctly different from wipe fabric that, in accordance with the prior art, is either physically immovably secured in place, or loosely lies over a supporting resilient surface during cleaning. In use, both prior art designs deflect the wipe fabric in a manner that allows localized high compression loads at the point of contact between the fiber optic component and the wipe fabric surface.

As shown in FIG. 1, a cleaning device 10 comprises a generally rectangular dispenser container 12 having a face 14 which is overlain by a flap 16 having a tab 16a which, when flap 16 is closed, is engaged within slit 16b. FIG. 1 shows flap 16 partly open to better reveal face 14. Face 18 of container 12 is adjacent to face 14 and a portion of flap 16 is broken-away adjacent to face 18 to show a slot-shaped outlet opening 20 formed in face 14 adjacent the hinge 16c of flap 16. Flap 16 has a plurality of slots formed in it. A first feed slot 24a is formed adjacent hinge 16c and four parallel cleaning slots 26a, 26b, 26c and 26d are disposed perpendicularly to feed slot 24a. Second and third feed slots 24b and 24c are spaced apart from each other and disposed parallel to feed slot 24a.

An electrically conductive material, such as a metal layer or a metal foil, e.g., aluminum foil, is positioned on the device to contact the wipe fabric in order to dissipate static electricity which may be generated by movement of the wipe fabric across the device and/or by rubbing the optical fiber component on the wipe fabric. A layer of metallic, e.g., aluminum, foil 30 is adhered to at least the outer surface of flap 16 and has slots in it corresponding to the feed and cleaning slots. This is conveniently attained by adhering the foil to flap 16 prior to punching out slots 24a-24c and 26a-26d. Optionally, a foil 30a may be adhered to face 14 to be at least coextensive with the area of face 14 which extends from slightly above feed slot 24b to slightly below feed slot 24c when flap 16 is closed. In another embodiment, foil 30a may optionally be extended to the vicinity of slit 16b. In yet another embodiment, foil may be adhered to both the outer and inner surfaces of flap 16, as described below in connection with FIG. 7A.

In use, and referring to FIGS. 1 and 2, a length of cleaning wipe fabric 22 (FIG. 2) is withdrawn via outlet opening 20 from a roll 22a of cleaning fabric stored within the interior of dispenser container 12. The initial withdrawal of fabric 22 is facilitated by opening flap 16 as shown in FIG. 1. Subsequent withdrawals of fabric 22 are effectuated with flap 16 closed, by simply pulling on the protruding length of fabric 22. In any case, with flap 16 open, the leading edge of fabric 22 is threaded outwardly through feed slot 24a, is passed over cleaning slots 26a-26d and thence inwardly into feed slot 24b under flap 16, and then outwardly through slot 24c. Wipe fabric 22 may be extended over the area of flap 16 indicated by the dimension arrow x in FIG. 1. Flap 16 is then closed and tab 16a is inserted into slit 16b to hold flap 16 in place. The flow path of wipe fabric 22 is indicated by the unnumbered arrows in FIG. 1. The wipe fabric 22 is held in place by frictional engagement with face 14 and the underside of flap 16 and (optionally) by contact with the edges of one or more of feed slots 24a, 24b and 24c.

The wipe fabric 22 is thus positioned over parallel cleaning slots 26a, 26b, 26c and 26d. With flap 16 closed, each cleaning slot 26a-26d will overlie a respective color band 28a, 28b. Two additional color bands which align with cleaning slots 26c and 26d respectively, when flap 16 is closed, are omitted from FIG. 1 to simplify the illustration. Each color band 28a, 28b, etc., is of a different color or is otherwise made individually distinguishable for the purpose described below. The tape-like roll 22a of cleaning wipe fabric preferably has equally spaced-apart transverse perforations (not shown). A suitable length of the fabric may be withdrawn from the dispenser for positioning over the entire surface of flap 16, including the cleaning slot or slots 26a-26d. The transverse perforations in the wipe fabric facilitate separating the withdrawn portion of fabric from the roll and individual sheets of cleaning wipes from the leading end of the roll, so that the used cleaning wipes may be replaced and removed as needed. The entire outer surface of flap 16 provides a fabric support surface, i.e., a support surface for fabric 22.

The portion of the wipe fabric 22 overlying one or more of the cleaning slots 26a-26d (cleaning slot 26a in FIG. 2B) is used by the operator to clean the fiber optic ends as illustrated in FIG. 2C, in which an optical fiber connector 32 has a protuberant fiber optic strand 32a (FIG. 2C-1) having a transmission face 32b. Optical fiber connector 32 is cleaned by having its transmission face 32b rubbed back and forth over wipe fabric 22 as shown in FIG. 2C.

As is well known to those skilled in the art, the cleaning may be carried out on dry cleaning wipe fabric or the fabric may be wetted with a suitable cleaning agent such as a solvent. Tearing of the fabric can be further exacerbated by the introduction of cleaning fluids to the fabric, which may further compromise a fabric's tensile recovery at the point of contact. These broken particles are detrimental to the cleaning process because they are frequently deposited onto the fiber optic component, thereby reducing, often drastically, light transmission through the fiber optic component.

The present invention, by providing for the cleaning wipe fabric to sag under the pressure imposed by the fiber optic component being cleaned, and to retain that "durable sag" provides effective cleaning while greatly reducing the risk of scoring the cleaning fabric.

The depth of cleaning slots 26a-26d is determined by the thickness of the support member, which is provided by flap 16 in the illustrated embodiment. The depth of the cleaning slots is indicated by dimension arrow d in FIGS. 2B and 2C. Depth d extends to the floor 26a' of slot 26a which, in the illustrated embodiment, is provided by face 14 of dispenser container 12. The depth d may be, for example, from about 0.02 to about 0.06 inch (about 0.51 mm to about 1.52 mm), or from about 0.024 to about 0.055 inch (about 0.61 mm to about 1.40 mm). These depths are great enough to permit the cleaning wipe fabric to sag into the cleaning slots sufficiently to provide an enduring sag as described above. Generally, the support member may be made of any suitable material which is thick enough to provide sufficient depth of the cleaning slots to accommodate deflection and sagging of the cleaning wipe fabric overlying the cleaning slots. Obviously, any suitable depth d may be employed. Generally, the wipe fabric 22 is secured to the card-like member (flap 16 in the embodiment of FIGS. 1-2C) loosely enough so that the wipe fabric does not "push back" against the optical fiber component with a force sufficient to restore the fabric to, or close to, its original, taut position (FIG. 2B) over the cleaning slot.

Such sagging of the cleaning wipe fabric serves not only to enable full contact of the transmission face 32b and the immediately adjacent portion 32a of the fiber optic strand 32 for enhanced cleaning, but helps to prevent scoring or tearing of the cleaning wipe fabric, as described above.

In contrast, U.S. Pat. No. 6,865,770, discussed above, has the loose fiber optic cleaning fabric supported on a resilient surface carried on the face of the dispenser box. The resistance provided by the rigid support under the resilient surface is conducive to scoring or tearing of the cleaning fabric. This is particularly so when one considers that the operator would be using thumb and forefinger spaced apart to hold the loose cleaning wipe fabric in place on the resilient surface while carrying out the cleaning. Similarly, Miyake et al. U.S. Pat. No. 6,681,437, discussed above, has the cleaning fabric fixed firmly in place and tautly held above the groove 76b, instead of being removably secured and slidably movable, as in the present invention. The Miyake et al. arrangement is also susceptible to scoring or tearing of the cleaning wipe fabric because the fabric is fixed tautly in place and cannot slide through its restraints to accommodate the imposed pressure.

The provision of a plurality of parallel cleaning slots helps the user to avoid cleaning a second fiber optical component on, or making a second pass over, an already used area of the cleaning wipe fabric.

The different colors or other coding provided by color bands 28a, 28b, etc., also helps the operator to remember which areas of the wipe fabric have already been utilized. The wipe fabric is thin enough for the color bands 28a, 28b, etc., to show through the fabric. Obviously, indicia other than, or in addition to, the color bands could be used, such as numerals, letters or distinctive geometric shapes or combinations of any two or more thereof. The wipe fabric is movable in fabric-advance travel relative to the member in which the cleaning slots are formed, whereby the same cleaning slots may be used repeatedly, with used cleaning wipe fabric being removed and replaced over the cleaning slots by fresh cleaning wipe fabric.

The foil 30 and, when present, foil 30a, serves to dissipate any static electricity generated by fabric-advance travel of the wipe fabric over the support surface and into position, and by wiping the fiber optic strand ends over the wipe fabric 22. As those skilled in the art will appreciate, static electricity is deleterious because it attracts minute particles and motes which may adhere to the transmission face of the fiber optic being cleaned with disastrous degradation of light transmission. Suitable electrostatic discharge material other than foil may of course be used.

In cleaning device 10 of FIG. 1, the area indicated by dimension arrows x and y provides additional work surface for less stringent cleaning operations, for example, for cleaning the exterior of fiber optic cables, etc., using a segment of the wipe fabric which may include areas which have already been used for the more demanding cleaning of fiber optic ends.

FIGS. 3 and 4 show a second embodiment of the invention in which the cleaning device 110 comprises a stand-alone device, that is, it need not be an integral portion of a dispenser container. In this embodiment, a support board 34 supports a card-like member comprising a slotted member 36 in which are formed a plurality of cleaning slots 126a, 126b, 126c and 126d. These cleaning slots are disposed parallel to each other, and extend longitudinally along the cleaning device 110. A metallic foil 130 is mounted upon slotted member 36. As in the other embodiments, the cleaning slots are punched through the foil as well as through slotted member 36. Hold-down clips 38a, 38b, 38c and 38d are positioned on cleaning device 110 to hold in place a length of cleaning wipe fabric 122, which may be obtained from any source, such as a conventional dispenser container. The entire surface of cleaning device 110 provides a fabric support surface. FIGS. 1, 3 and 4 show that the fabric-retaining structure, e.g., the feed slots 24a, 24b and 24c (FIG. 1) and the hold-down clips 38a, 38b and 38c (FIGS. 3 and 4), is disposed so as not to obstruct the cleaning slots.

Figure 4A:
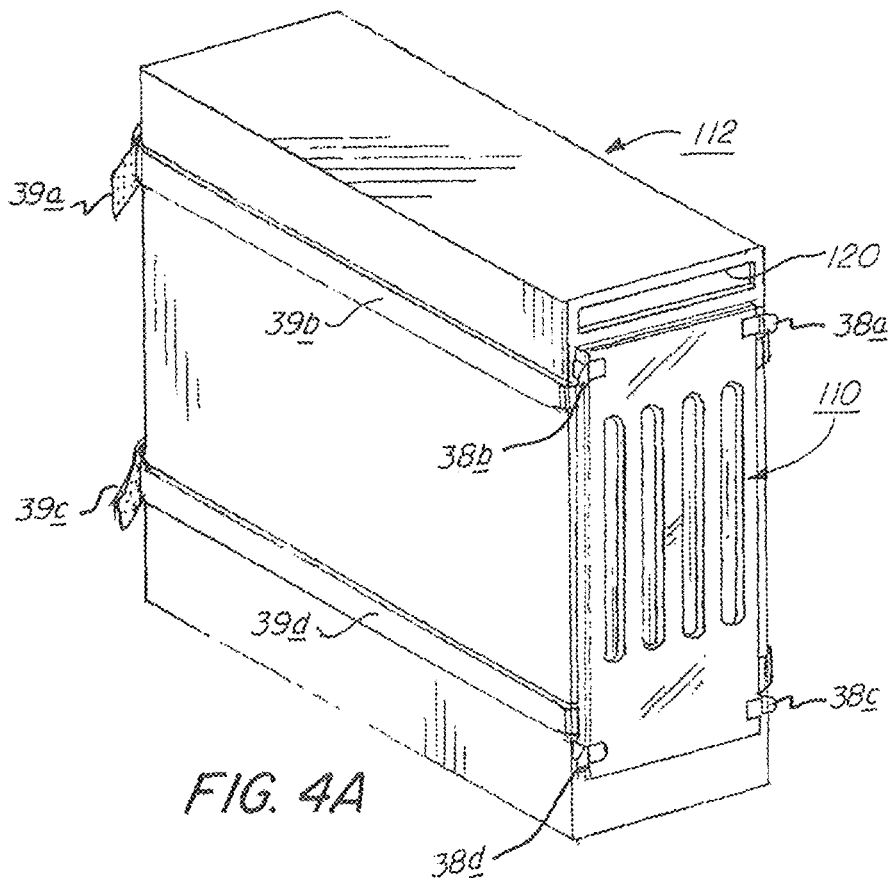
FIG. 4A is a perspective view of the cleaning device of FIG. 3 secured to a conventional dispenser container.

FIG. 4A shows the cleaning device 110 of FIGS. 3 and 4 mounted on an otherwise conventional dispenser container 112 by means of straps 39a, 39b and 39c, 39d. Container 112 has a slot 120 from which the cleaning wipe fabric is withdrawn and disposed over cleaning slots 126a-126d (FIG. 3). The cleaning wipe fabric, not shown in FIG. 4A, is removably retained in place by hold-down clips 38a, 38b, 38c and 38d. Cleaning device 110 may be removed from dispenser container 112 and fastened to a new or replaceable dispenser container as needed.

Clips 38a-38d retain the length of fabric 122 under sufficient tension so that the end of a optical fiber lead may be cleaned in the manner illustrated in FIG. 2B by deflecting the cleaning wipe fabric so that it sags into the cleaning slots. Cleaning device 110 may be supplied with replacement lengths of cleaning fabric 122 torn from a perforated roll of such fabric as needed. Alternatively, cleaning device 110 may be removably attached to a conventional dispenser container. Such attachment may be by any suitable means such as spring clips, a low-tack adhesive, elastic bands or, as illustrated, straps 39a, 39b, 39c and 39d. Such straps may have releasable connector means such as buckles or gripping fabrics of the type sold under the trademark VELCRO.

Figure 5:
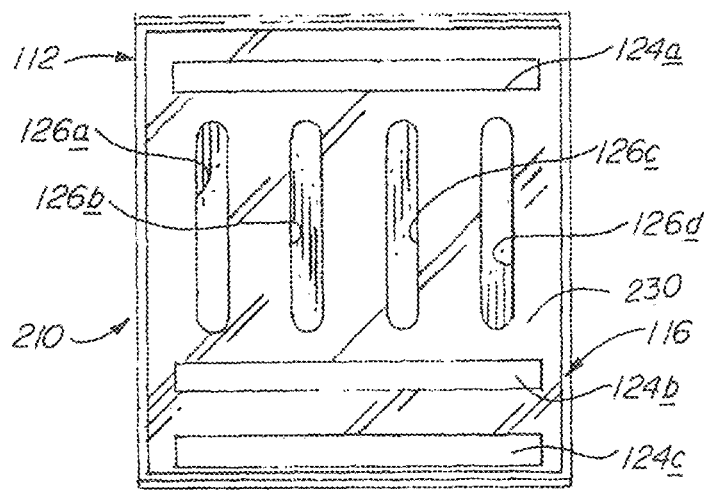
FIG. 5 is a front view in elevation of a cleaning device in accordance with a third embodiment of the present invention.

FIG. 5 is an end view of a cleaning device 210 which is of smaller size than cleaning device 10 illustrated in FIG. 1, but is of substantially similar construction with respect to its feed slots 124a, 124b and 124c and its cleaning slots 126a, 126b, 126c and 126d. These generally correspond to the slots of cleaning device 10 of FIG. 1. Cleaning device 210 is comprised of a dispenser container 112 of generally rectangular construction and similar to, but usually smaller than, that of cleaning device 10 of FIG. 1. Dispenser container 112 comprises a flap 116 which corresponds to flap 16 of FIG. 1 and has a metallic foil 230 on the outer surface thereof. Flap 116 is shown in FIG. 5 in the closed position. A roll of cleaning wipe fabric (not shown in FIG. 5) is contained within cleaning device 210.

Cleaning device 210 of FIG. 5 differs from cleaning device 10 in that the portion thereof corresponding to face 14 and flap 16 of FIG. 1 are foreshortened relative to cleaning device 10. That is, the portion of cleaning device 10 indicated by dimension lines x and y in FIG. 1 is omitted in the device of FIG. 5. Generally, the area occupied by the feed and cleaning slots of cleaning device 10 may, but need not, be substantially the same for both the embodiments of FIG. 1 and FIG. 5. Cleaning device 210 will have thereon a length of foil 130 corresponding to foil 30 of FIG. 1.

Figure 6:
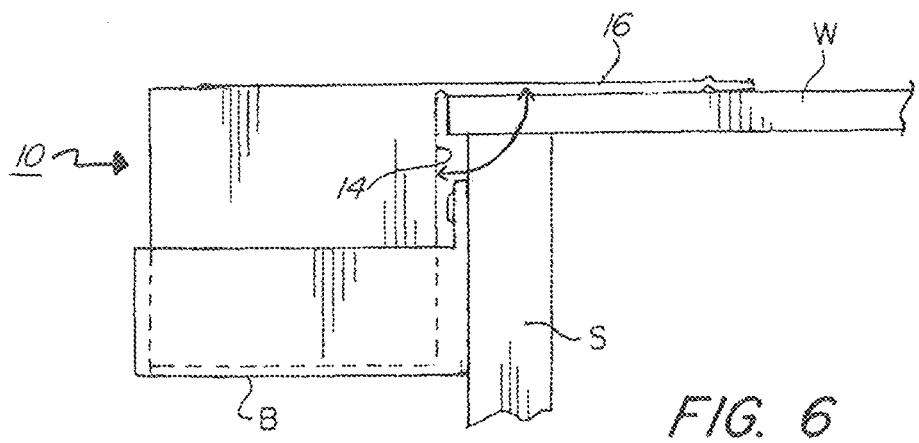
FIG. 6 is a schematic side view in elevation showing the cleaning device of FIG. 1 with the flap opened and the cleaning device oriented to permit use directly on a support surface.

In use, the cleaning device 10 of FIG. 1 may be positioned as shown in FIG. 1 with flap 16 in a vertical position. Alternatively, cleaning device 10 may be rotated ninety degrees to position flap 16 horizontally during use. FIG. 6 shows an arrangement in which cleaning device 10 is used with flap 16 in a fully open position spaced 90 degrees of rotation from face 14, as shown by the unnumbered curved arrow. Cleaning device 10 is supported in a bracket B which is secured to a support leg S of a work surface W. Cleaning wipe fabric 22 is not shown in FIG. 6 but will be threaded through feed slots 24a, 24b and 24c as shown in FIG. 1.

Figure 7:
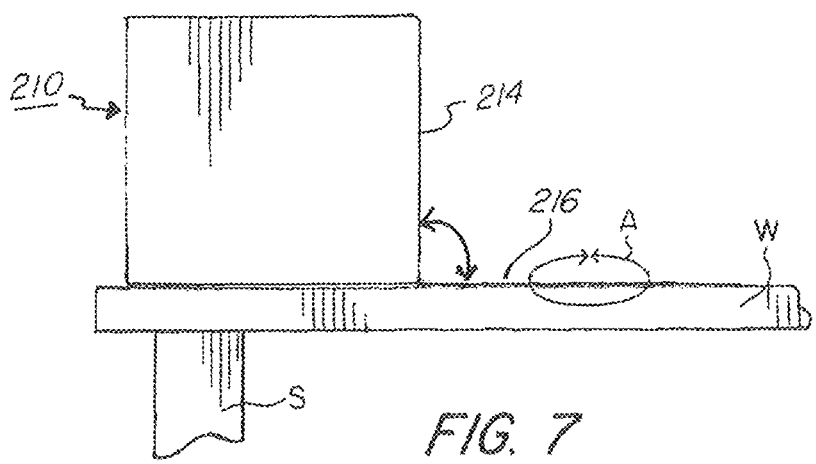
FIG. 7 is a schematic side view in elevation showing a cleaning device similar to that of FIG. 1 with the flap opened and the cleaning device oriented to be disposed on a support bracket to permit use directly on a support surface.
Figure 7A:
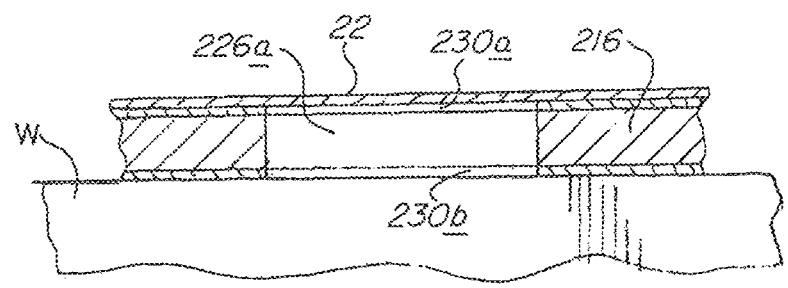
FIG. 7A is a view, enlarged relative to FIG. 7, of that portion of FIG. 7 enclosed by the area A.

FIG. 7 shows a cleaning device 210 which is a modified version of cleaning device 10 in that an electrostatic-discharging foil layer 230a (FIG. 7A) is disposed at least on the inside of flap 216. As in the case of the embodiment of FIG. 6, flap 21 is open and rotated 90° away from face 114 as shown by the unnumbered curved arrow. Cleaning device 210 is upside-down relative to the position of cleaning device 10 as shown in FIG. 6. In this case, wipe fabric 22, not shown in FIG. 7, is threaded through cleaning slots, also not shown in FIG. 7, so as to removably retain the wipe fabric on the inside (top surface as viewed in FIG. 7) of flap 216. However, in order to enable the same dispenser container to be used in any of the orientations described with respect to FIGS. 1, 6 and 7, flap 216 may have a metallic foil layer on either side thereof, as illustrated in FIG. 7A, which shows a cleaning slot 226a of flap 216. Thus, a foil layer 230a extends over the inside of flap 216 and a foil layer 230b extends over the outside of flap 216. In this way, a single version of the cleaning device may be used in any of the orientations shown.

Utilization of parallel cleaning slots permits multiple uses of a single length or sheet of the cleaning wipe fabric without danger of using the same area of the sheet twice.

While electrostatic discharge capability is provided in the illustrated embodiments by a metallic, e.g., aluminum, foil, obviously any suitable electrostatic discharge fabric will suffice. Dispenser container 12 may be made of any suitable material such as cardboard, plastic or a combination thereof. The use of a dispenser container 12 to hold a roll of cleaning wipe fabric is advantageous as it protects the roll of fabric from contamination by dirt, dust motes, etc.

While the invention has been described in detail with reference to specific embodiments, it will be appreciated that numerous variations may be made to the described embodiments which variations nonetheless lie within the scope of the present invention.

What is claimed is:

1. A cleaning device for optical fiber strands, the cleaning device comprising:
a dispenser container having an exterior face and a hinged support member connected to the exterior of the container by a hinge, the support member having a fabric support surface having a slotted portion in which are formed one or more cleaning slots having respective slot depths;
a cleaning wipe fabric disposed within the container so as to be fed through a feed slot formed in the container onto the fabric support surface, to thereby provide a free length of the cleaning wipe fabric disposed in a cleaning position upon the fabric support surface and overlying the slotted portion thereof, to define a cleaning section of the fabric having one or more suspended portions of the fabric suspended over and bridging the one or more cleaning slots;
the hinged support member being pivotable about the hinge between a closed position in which the support member overlies the exterior face and an open position in which the support member leaves the exterior face exposed; and
wherein the hinged support member is in the closed position, whereby the exterior face provides a floor surface for the one or more cleaning slots.

2. A cleaning device for optical fiber strands, the cleaning device comprising:
a dispenser container having an exterior face and a hinged support member connected to the exterior of the container by a hinge, the support member having a fabric support surface having a slotted portion in which are formed one or more cleaning slots having respective slot depths;
a cleaning wipe fabric disposed within the container so as to be fed through a feed slot formed in the container onto the fabric support surface, to thereby provide a free length of the cleaning wipe fabric disposed in a cleaning position upon the fabric support surface and overlying the slotted portion thereof, to define a cleaning section of the fabric having one or more suspended portions of the fabric suspended over and bridging the one or more cleaning slots;
the hinged support member being pivotable about the hinge between a closed position in which the support member overlies the exterior face and an open position in which the support member leaves the exterior face exposed; and
wherein the hinged support member is in the open position and disposed on a work surface, whereby such work surface provides a floor surface for the one or more cleaning slots.

3. The cleaning device of claim 2 wherein the support member is disposed at an angle of about ninety degrees to the exterior face.

4. The cleaning device of claim 2 wherein the support member is disposed at an angle of about one hundred eighty degrees to the exterior face.

5. The cleaning device of claim 1, claim 3, claim 4 or claim 2 wherein a plurality of the cleaning slots are provided in the slotted portion of the support member.

6. The cleaning device of claim 1, claim 3, claim 4 or claim 2 further comprising a fabric-retaining structure comprised of one or more retention members disposed on the support member and moveable between a securement position in which the fabric is retained in the cleaning position and a release position in which the fabric is released for fabric-advance travel.

7. The cleaning device of claim 1, claim 3, claim 4 or claim 2 further comprising a fabric-retaining structure comprised of one or more feed slots through which the fabric is fed, the feed slots being configured to exert a frictional drag on the fabric which drag is sufficient to secure the fabric in the cleaning position while under such cleaning pressure but insufficient to prevent fabric-advance travel.

8. The cleaning device of claim 1, claim 3, claim 4 or claim 2 wherein the fabric has a tape-like configuration and is in the form of a roll of the fabric.

9. The cleaning device of claim 1, claim 3, claim 4 or claim 2 further comprising an electrically conductive material disposed on at least one side of the fabric support surface and in the travel path, whereby the electrically conductive material contacts the fabric to dissipate static electrical charges from the fabric.

10. The cleaning device of claim 1, claim 3, or claim 4 or claim 2 comprising a plurality of the cleaning slots, each of which is distinctively marked by being associated with a distinctive code symbol selected from the class consisting of one or more of a distinctive color, a distinctive geometric shape, a number, and a letter of the alphabet.

11. The cleaning device of claim 1 or claim 2 wherein the slot depth of the one or more cleaning slots is sufficient to allow the suspended portions of the fabric to sag into their associated one or more cleaning slots when cleaning pressure is applied to the suspended portions of the fabric by wiping tips of such optical fiber strands on the suspended portions to clean such tips.

12. The cleaning device of claim 1 or claim 2 wherein a fabric-retaining structure is operatively associated with the support member and disposed so as to expose one or more of the suspended portions of the fabric to access by such optical fiber strands, the fabric-retaining structure serving (1) to removably secure the fabric in the cleaning position whereby the tip of a fiber optic strand can be cleaned by wiping such tip over one or more of the suspended portions of the fabric, and (2) to release such fabric for fabric-advance travel relative to the support surface, whereby such travel serves to position a fresh section of the fabric overlying the slotted portion.

13. The cleaning device of claim 1 or claim 2 wherein the slot depth of the one or more cleaning slots is sufficient to allow the suspended portions of the fabric to sag into their associated one or more cleaning slots when cleaning pressure is applied to the suspended portions of the fabric by wiping tips of such optical fiber strands on the suspended portions to clean such tips, and the slot depths of the one or more cleaning slots is such as to preclude such cleaning pressure from forcing the one or more suspended portions of the fabric into contact with the floor surface of the associated cleaning slot.

14. The cleaning device of claim 1 or claim 2 wherein the slot depth of the one or more cleaning slots is sufficient to allow the suspended portions of the fabric to sag into their associated one or more cleaning slots when cleaning pressure is applied to the suspended portions of the fabric by wiping tips of such optical fiber strands on the suspended portions to clean such tips, and the slot depths of the one or more cleaning slots is such as to allow the tip of such fiber optic strand to force the fabric covering the tip into only minimal contact with the floor surface of the cleaning slot whereby to minimize potential for abrasion, breakage or shearing of individual filaments or fibers of the wipe fabric.

15. The cleaning device of claim 1 or claim 2 further comprising a fabric-retaining structure which comprises at least one feed slot upstream of the one or more cleaning slots and at least one feed slot downstream of the one or more cleaning slots, as sensed in the direction of fabric-advance travel of such fabric along the support member.

16. The cleaning device of claim 15 wherein the fabric-retaining structure further comprises at least two feed slots disposed adjacent to each other along the fabric-advance travel path, with no cleaning slot interposed between them.

17. The cleaning device of claim 15 wherein fabric-advance travel of such fabric is along a travel path extending longitudinally along the support member, and the feed slots are disposed orthogonally to the travel path.

18. The cleaning device of claim 17 wherein the one or more cleaning slots are disposed parallel to the travel path.

* * * * *